United States Patent
Oliver et al.

(10) Patent No.: US 8,732,256 B2
(45) Date of Patent: *May 20, 2014

(54) MESSAGE CHALLENGE RESPONSE (71) Applicant: SonicWALL, Inc., San Jose, CA (US)

(72) Inventors: Jonathan J. Oliver, San Carlos, CA (US); Brian K. Wilson, Palo Alto, CA (US); Damon K. Uyeda, San Francisco, CA (US); Scott D. Eikenberry, Menlo Park, CA (US); David A. Koblas, Los Altos, CA (US); Tim Nufire, San Francisco, CA (US)

(73) Assignee: SonicWALL, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/787,693

(22) Filed: Mar. 6, 2013

(65) Prior Publication Data
US 2013/0191480 A1  Jul. 25, 2013

Related U.S. Application Data (63) Continuation of application No. 10/387,352, filed on Mar. 11, 2003, now Pat. No. 8,396,926, which is a continuation-in-part of application No. 10/197,393, filed on Jul. 16, 2002.

(51) Int. Cl.
G06F 15/16 (2006.01)
(52) U.S. Cl.
USPC .......................................... 709/206; 709/205
(58) Field of Classification Search
USPC ....................................................... 709/206
See application file for complete search history.

(56) References Cited

U.S. PATENT DOCUMENTS

| | | |
|---|---|---|
| 5,999,929 A | 12/1999 | Goodman |
| 6,023,723 A | 2/2000 | McCormick et al. |
| 6,026,491 A | 2/2000 | Hiles |
| 6,052,709 A | 4/2000 | Paul |
| 6,055,508 A | 4/2000 | Naor et al. |
| 6,072,942 A | 6/2000 | Stockwell et al. |
| 6,076,101 A | 6/2000 | Kamakura et al. |
| 6,112,227 A | 8/2000 | Heiner |
| 6,199,102 B1 | 3/2001 | Cobb |
| 6,234,802 B1 | 5/2001 | Pella et al. |
| 6,266,692 B1 | 7/2001 | Greenstein |
| 6,393,465 B2 | 5/2002 | Leeds |
| 6,421,709 B1 | 7/2002 | McCormick et al. |
| 6,424,997 B1 | 7/2002 | Buskirk et al. |

(Continued)

FOREIGN PATENT DOCUMENTS

CA  2 274 352  12/2000

OTHER PUBLICATIONS

"Active SMTP White Paper," ESCOM Corp. 2000-2006.

(Continued)

Primary Examiner — Tauqir Hussain
(74) Attorney, Agent, or Firm — Lewis Roca Rothgerber LLP (57) ABSTRACT A system and method are disclosed for registering a email sender for the purpose of sending an email message to an email receiver including receiving a challenge message wherein the challenge message includes a machine answerable question; processing the challenge message to determine that it is a challenge message sent for the purpose of authorizing delivery of the email message; analyzing the question to determine a valid response to the challenge message; and sending the valid response that includes the answer wherein a nontrivial amount of resources are required to send the valid response.

16 Claims, 4 Drawing Sheets

(56) References Cited

U.S. PATENT DOCUMENTS

| | | |
|---|---|---|
| 6,438,690 B1 | 8/2002 | Patel et al. |
| 6,453,327 B1 | 9/2002 | Nielsen |
| 6,460,073 B1 | 10/2002 | Asakura |
| 6,539,092 B1 | 3/2003 | Kocher |
| 6,546,416 B1 | 4/2003 | Kirsch |
| 6,563,912 B1 | 5/2003 | Dorfman et al. |
| 6,615,242 B1 | 9/2003 | Riemers |
| 6,640,301 B1 | 10/2003 | Ng |
| 6,643,686 B1 | 11/2003 | Hall |
| 6,650,890 B1 | 11/2003 | Irlam et al. |
| 6,654,787 B1 | 11/2003 | Aronson et al. |
| 6,691,156 B1 | 2/2004 | Drummond et al. |
| 6,708,205 B2 | 3/2004 | Sheldon et al. |
| 6,728,378 B2 | 4/2004 | Garib |
| 6,732,149 B1 | 5/2004 | Kephart |
| 6,760,752 B1 | 7/2004 | Liu |
| 6,772,196 B1 | 8/2004 | Kirsch et al. |
| 6,775,691 B1 | 8/2004 | Kubik et al. |
| 6,778,941 B1 | 8/2004 | Worrell et al. |
| 6,779,021 B1 | 8/2004 | Bates et al. |
| 6,829,635 B1 | 12/2004 | Townshend |
| 6,836,750 B2 | 12/2004 | Wong et al. |
| 6,842,773 B1 | 1/2005 | Ralston et al. |
| 6,851,051 B1 | 2/2005 | Bolle et al. |
| 6,868,498 B1 | 3/2005 | Katsikas |
| 6,876,977 B1 | 4/2005 | Marks |
| 6,931,433 B1 | 8/2005 | Ralston et al. |
| 6,941,348 B2 | 9/2005 | Petry et al. |
| 6,963,928 B1 | 11/2005 | Bagley et al. |
| 6,965,919 B1 | 11/2005 | Woods et al. |
| 7,003,724 B2 | 2/2006 | Newman |
| 7,006,993 B1 | 2/2006 | Cheong et al. |
| 7,016,875 B1 | 3/2006 | Steele et al. |
| 7,016,877 B1 | 3/2006 | Steele et al. |
| 7,039,949 B2 | 5/2006 | Cartmell |
| 7,072,943 B2 | 7/2006 | Landesmann |
| 7,076,241 B1 | 7/2006 | Zondervan |
| 7,127,405 B1 | 10/2006 | Frank et al. |
| 7,149,778 B1 | 12/2006 | Patel et al. |
| 7,171,450 B2 | 1/2007 | Wallace et al. |
| 7,178,099 B2 | 2/2007 | Meyer et al. |
| 7,194,515 B2 | 3/2007 | Kirsch |
| 7,206,814 B2 | 4/2007 | Kirsch |
| 7,231,428 B2 | 6/2007 | Teague |
| 7,249,175 B1 | 7/2007 | Donaldson |
| 7,275,082 B2 | 9/2007 | Pang |
| 7,275,095 B1 | 9/2007 | Lebouill |
| 7,293,063 B1 | 11/2007 | Sobel |
| 7,299,261 B1 | 11/2007 | Oliver et al. |
| 7,343,624 B1 | 3/2008 | Rihn et al. |
| 7,441,277 B2 | 10/2008 | Burges |
| 7,539,726 B1 | 5/2009 | Wilson et al. |
| 7,660,737 B1 | 2/2010 | Lim et al. |
| 7,908,330 B2 | 3/2011 | Oliver et al. |
| 7,921,204 B2 | 4/2011 | Wilson et al. |
| 8,090,778 B2 | 1/2012 | Malik et al. |
| 8,296,382 B2 | 10/2012 | Wilson |
| 8,396,926 B1 | 3/2013 | Oliver et al. |
| 8,527,337 B1 | 9/2013 | Lim et al. |
| 2001/0044803 A1 | 11/2001 | Szutu |
| 2001/0047391 A1 | 11/2001 | Szutu |
| 2002/0046275 A1 | 4/2002 | Crosbie et al. |
| 2002/0087573 A1 | 7/2002 | Reuning et al. |
| 2002/0116463 A1 | 8/2002 | Hart |
| 2002/0162025 A1 | 10/2002 | Sutton et al. |
| 2002/0188689 A1 | 12/2002 | Michael |
| 2002/0199095 A1 | 12/2002 | Bandini et al. |
| 2003/0009526 A1 | 1/2003 | Bellegarda et al. |
| 2003/0023692 A1 | 1/2003 | Moroo |
| 2003/0023736 A1 | 1/2003 | Abkemeier |
| 2003/0041126 A1 | 2/2003 | Buford et al. |
| 2003/0041280 A1 | 2/2003 | Malcolm et al. |
| 2003/0046421 A1 | 3/2003 | Horvitz et al. |
| 2003/0069933 A1 | 4/2003 | Lim et al. |
| 2003/0105827 A1 | 6/2003 | Tan et al. |
| 2003/0149726 A1 | 8/2003 | Spear |
| 2003/0158903 A1 | 8/2003 | Rohall et al. |
| 2003/0163357 A1 | 8/2003 | Engleman et al. |
| 2003/0167311 A1 | 9/2003 | Kirsch |
| 2003/0195764 A1 | 10/2003 | Baker et al. |
| 2003/0195937 A1 | 10/2003 | Kircher et al. |
| 2003/0196116 A1 | 10/2003 | Troutman |
| 2003/0204569 A1 | 10/2003 | Andrews et al. |
| 2003/0229672 A1 | 12/2003 | Kohn |
| 2003/0233418 A1 | 12/2003 | Goldman |
| 2003/0236847 A1 | 12/2003 | Benowitz et al. |
| 2004/0003283 A1 | 1/2004 | Goodman et al. |
| 2004/0015554 A1 | 1/2004 | Wilson |
| 2004/0024639 A1 | 2/2004 | Goldman |
| 2004/0030776 A1 | 2/2004 | Cantrell et al. |
| 2004/0059786 A1 | 3/2004 | Caughey |
| 2004/0083270 A1 | 4/2004 | Heckerman et al. |
| 2004/0103160 A1 | 5/2004 | Sheldon et al. |
| 2004/0117451 A1 | 6/2004 | Chung |
| 2004/0158554 A1 | 8/2004 | Trottman |
| 2004/0167964 A1 | 8/2004 | Rounthwaite et al. |
| 2004/0177120 A1 | 9/2004 | Kirsch |
| 2004/0243844 A1 | 12/2004 | Adkins |
| 2005/0055410 A1 | 3/2005 | Landsman et al. |
| 2005/0081059 A1 | 4/2005 | Bandini et al. |
| 2005/0114705 A1 | 5/2005 | Reshef et al. |
| 2005/0125667 A1 | 6/2005 | Sullivan et al. |
| 2005/0172213 A1 | 8/2005 | Ralston et al. |
| 2005/0256841 A1 | 11/2005 | Rawat et al. |
| 2006/0010217 A1 | 1/2006 | Sood |
| 2006/0031346 A1 | 2/2006 | Zheng et al. |
| 2006/0036693 A1 | 2/2006 | Hulten et al. |
| 2006/0095528 A1 | 5/2006 | Sykes |
| 2006/0282888 A1 | 12/2006 | Bandini et al. |
| 2007/0083606 A1 | 4/2007 | Malik et al. |
| 2008/0016579 A1 | 1/2008 | Pang |
| 2008/0168145 A1 | 7/2008 | Wilson |
| 2008/0271116 A1 | 10/2008 | Robinson et al. |
| 2010/0325728 A1 | 12/2010 | Pang |
| 2011/0231503 A1 | 9/2011 | Wilson |
| 2013/0339458 A1 | 12/2013 | Wilson |
| 2014/0032540 A1 | 1/2014 | Lim et al. |

OTHER PUBLICATIONS

"Digital Signature," http://www.cnet.com/Reources/Info/Glossary/Terms/digitalsignature.html, last accessed Nov. 15, 2006.

"Hash Function," http://en.wikipedia.org/wiki/Hash.sub.--value, last accessed Nov. 15, 2006.

"Majordomo FAQ," Oct. 20, 2001.

"Setting up Email Spam Filters using Microsoft Outlook" BershireNet Support print out www.berkshire.net/support/filters.sub.--msoutlook.html as archived on Nov. 8, 2002, 12 pages.

Anon:, "Correspondence Negotiation Protocol," http://ww.cs.sfu.ca/--cameron/CNP.html.

Anon., "Cloudmark, Different Approaches to Spamfighting," Whitepaper, Version 1.0, Nov. 2002.

Anon., "DigiPortal Software, Creating Order from Chaos," Support, Frequently Asked Questions, http://ww/digiportal.com/support/choicemail/faq.html.

Anon., "Challenge Messages," Mailblocks, http://suport.mailblocks.com/tab.sub.--howto/Validation/detail.sub.--priv- acy.sub.--challenge.asp.

Anon., "How Challenge/Response Works," http://about.mailblocks.com/challenge.html.

Anon. "The Lifecycle of Spam", PC Magazine, Feb. 25, 2003, pp. 74-97.

Anon., "Project: Vipul's Razor: Summary," http://sourceforge.net/projects/razor/.

Balvanz, Jeff, et al., "Spam Software Evaluation, Training, and Support: Fighting Back to Reclaim the Email Inbox," in the Proc. of the 32nd Annual ACM SIGUCCS Conference on User Services, Baltimore, MD, pp. 385-387, 2004.

Byrne, Julian, "My Spamblock," Google Groups Thread (Jan. 19, 1997).

Cranor, Lorrie, et al., "Spam!," Communications of the ACM, vol. 41, Issue 8, pp. 74-83, Aug. 1998.

(56) References Cited

OTHER PUBLICATIONS

Dwork, Cynthia, et al. "Pricing via Processing or Combating Junk Mail," CRYPTO '92, Springer-Verlag LNCS 740, pp. 139-147, 1992.
Gabrilovich et al., "The Homograph Attack", Communications of the ACM, 45(2):128, Feb. 2002.
Georgantopoulous, Bryan, "MScin Speech and Language Processing Dissertation: Automatic summarizing based on sentence extraction: A statistical approach," Department of Linguistics, University of Edinburgh, http://cgi.di.uoa.gr/.about.bryon/msc.html.
Giant Company Software Announces Full Integrated AOL Support for its Popular Spam Inspector Anti-Spam Software, GIANT Company Software, Inc. 2002.
Gomes, Luiz, et al., "Characterizing a Spam Traffic," in the Proc. of the 4th ACM SIGCOMM Conference on Internet Measurement, Sicily, Italy, pp. 356-369, 2004.
Guilmette, Ronald F., "To Mung or Not to Mung," Google Groups Thread (Jul. 24, 1997).
Hoffman et al., Paul, "Unsolicited Bulk Email: Mechanisms for Control," Internet Mail Consortium Report: UBE-SOL, IMCR-008, revised May 4, 1998.
How to make sure a human is sending you mail Posted by Brandon Hume, Nov. 15, 1996 00:41:49, http://groups.google.ca/broup/news.admin.net.usenet/msg/e601783e8f40c545.
Jung, Jaeyeon, et al., "An Empirical Study of Spam Traffic and the Use of DNS Black Lists," IMC'04, Taormina, Sicily, Italy, Oct. 25-27, 2004.
Kolathur et al., Satheesh, "Spam Filter, A collaborative Method of Eliminating Spam," Whitepaper, published Dec. 8, 2000, http://www.cs.uh.edu/.about.kolathur/Paper.htm.
Langberg, Mike, "Spam Foe Needs Filter of Himself," (Email Thread Dated Apr. 5, 2003).
Lie, D.H.,"Sumatra: A system for Automatic Summary Generation," http://www.carptechnologies.nl/SumatraTWLT14paper/SumatraTWLT14.html.
Mastaler, Jason, "Tagged Message Delivery Agent (TMDA)," TDMA Hompage, 2003.
Mccullagh, Declan, "In-Boxes that Fight Back," News.com, May 19, 2003.
Open Mail Relay, obtained from the Internet at http://en.wikipedia.org/wiki/Open.sub.--mail.sub.--relay on Oct. 14, 2010.
Razor-agents 2.22, http://razor.sourceforge.net.
Skoll, David F., "How to Make Sure a Human is Sending You Mail," Google Groups Thread (Nov. 17, 1996).
Spamarrest, The Product, How it Works, http://spamarrest.com/products/howitworks.jsp.
SpamAssassin, "Welcome to SpamAssassin," http://spamassassin.org.
Templeton, Brad, "Viking-12 Junk E-Mail Blocker," (believed to have last been updated Jul. 15, 2003).
Von Ahn, Luis, et al., "Telling Humans and COmputers Apart (Automatically) or How Lazy Cryptographers do AI," Communications to the ACM, Feb. 2004.
Weinstein, Lauren, "Spam Wars," Communications of the ACM, vol. 46, Issue 8, p. 136, Aug. 2003.
U.S. Appl. No. 10/197,393 Office Action mailed Sep. 3, 2013.
U.S. Appl. No. 10/197,393 Final Office Action mailed Mar. 28, 2008.
U.S. Appl. No. 10/197,393 Office Action mailed Jun. 21, 2007.
U.S. Appl. No. 10/197,393 Final Office Action mailed Nov. 27, 2006.
U.S. Appl. No. 10/197,393 Office Action mailed Sep. 1, 2006.
U.S. Appl. No. 10/197,393 Final Office Action mailed Mar. 3, 2006.
U.S. Appl. No. 10/197,393 Office Action mailed Jul. 26, 2005.
U.S. Appl. No. 11/927,414 Office Action mailed Oct. 16, 2013.
U.S. Appl. No. 11/927,414 Final Office Action mailed Jul. 23, 2009.
U.S. Appl. No. 11/927,414 Office Action mailed Feb. 4, 2009.
U.S. Appl. No. 10/387,352 Final Office Action mailed Oct. 22, 2008.
U.S. Appl. No. 10/387,352 Office Action mailed Apr. 11, 2008.
U.S. Appl. No. 10/387,352 Final Office Action mailed Jul. 13, 2007.
U.S. Appl. No. 10/387,352 Office Action mailed Nov. 20, 2006.
U.S. Appl. No. 11/927,523 Office Action mailed Apr. 26, 2010.
U.S. Appl. No. 11/927,523 Final Office Action mailed Feb. 5, 2010.
U.S. Appl. No. 11/927,523 Final Office Action mailed Jun. 2, 2009.
U.S. Appl. No. 11/927,523 Office Action mailed Nov. 13, 2008.
U.S. Appl. No. 10/422,359, Office Action mailed Jun. 18, 2008.
U.S. Appl. No. 10/422,359, Final Office Action mailed Feb. 8, 2007.
U.S. Appl. No. 10/422,359, Office Action mailed Sep. 14, 2006.
U.S. Appl. No. 11/927,516, Final Office Action mailed Mar. 11, 2010.
U.S. Appl. No. 11/927,516, Office Action mailed May 13, 2009.
U.S. Appl. No. 13/080,638, Final Office Action mailed Mar. 9, 2012.
U.S. Appl. No. 13/080,638, Office Action mailed Feb. 27, 2012.
U.S. Appl. No. 11/927,414 Final Office Action mailed Feb. 18, 2014.
U.S. Appl. No. 10/197,393 Final Office Action mailed Dec. 27, 2013.

MESSAGE CHALLENGE RESPONSE

CROSS-REFERENCE TO RELATED APPLICATIONS

The present application is a continuation and claims the priority benefit of U.S. patent application Ser. No. 10/387,352 filed Mar. 11, 2003, which is a continuation-in-part and claims the priority benefit of U.S. patent application Ser. No. 10/197,393 filed Jul. 16, 2002, the disclosures of which is incorporated herein by reference.

The present invention is related to U.S. patent application Ser. No. 10/422,359 filed Apr. 23, 2003, the disclosure of which is incorporated herein by reference.

BACKGROUND OF THE INVENTION

1. Field of the Invention

The present invention relates generally to electronic messages. More specifically, a technique for avoiding spam emails is described.

2. Description of the Related Art

Electronic messages have become an indispensable part of modern communication. Electronic messages such as email or instant messages are popular because they are fast, easy, and have essentially no incremental cost. Unfortunately, these advantages of electronic messages are also exploited by marketers who regularly send out unsolicited junk messages (also referred to as "spam"). Spam messages are a nuisance for users. They clog people's email box, waste system resources, often promote distasteful subjects, and sometimes sponsor outright scams.

To reach a broad audience, the senders of spam (also referred to as "spammers") usually generate a huge amount of messages using automated computer programs. There are many existing techniques for filtering spam messages, some of which attempt to identify machine generated messages and block them. Upon receiving a message, the recipient may issue a challenge that is difficult for a computer to answer but easy for a person. For example, the challenge may include a picture of three objects, with the question "how many objects are in the picture?" The sender needs to choose three from a number of available answers and send the answer to the recipient. This type of question, referred to as a human answerable question, is difficult for machines to answer correctly but easy for human beings. The reply is then examined by the recipient's computer. The message is delivered to the recipient if the answer is correct, and processed as spam otherwise. This type of challenge/response scheme incurs significant overhead in for the sender of the email, making email no longer "free" and therefore more difficult for the spammers.

The challenge/response scheme described above is effective for blocking spam messages, but has many drawbacks. For example, since the message is not delivered until the challenge is answered, long delays may result if the sender is not available to answer the challenge right away. Also, the scheme is inconvenient for legitimate users that need to send out messages to new addresses often, for example a business that has many new clients. It would be desirable to have the benefit of the challenge/response scheme for spam blocking purposes, but does not result in long delays in message delivery or excessive burden for the sender.

In one exemplary embodiment of the present invention, a method of registering an electronic-mail (e-mail) sender for the purpose of sending e-mail to a recipient is provided. The e-mail sender receives a challenge message in response to an e-mail message previously sent by the e-mail sender, the challenge message including a machine answerable question. The challenge message is then processed to determine that the message is. a challenge message sent for the purpose of authorizing delivery of e-mail messages. Processing the challenge message in this regard includes identifying an indicator that the message is a challenge message. The message is then parsed to locate the machine answerable question in the challenge message. The question is then analyzed to determine a valid response to the challenge message. A nontrivial amount of resources are required to determine the valid response to the challenge message. The response to the challenge (i.e., the valid response) is then sent that includes an answer to the machine answerable question. Receipt of the response subsequently results in the e-mail sender being registered as a valid e-mail sender. As such, subsequent e-mail messages sent by the e-mail sender will not require sending a valid response to a challenge message.

Another embodiment of the present invention includes a computer-readable storage medium having embodied thereon a program. The program is executable by a computer processor to perform a method of registering an electronic-mail (e-mail) sender for the purpose of sending e-mail messages to an e-mail recipient.

A still further embodiment of the present invention discloses an electronic-mail (e-mail) server configured to complete a registration process for sending e-mail messages to art e-mail recipient. The e-mail server includes a network interface for receiving a challenge message in response to an e-mail message sent by the e-mail server. The challenge message is received over a communications network and includes a machine answerable question. The server also includes memory configured to store computer-executable instructions for answering the challenge message and a processor configured to execute the instructions stored in memory. When executed, the instructions provide for processing the challenge message to determine that the message is a challenge message for the purpose of authorizing delivery of e-mail messages. Processing the challenge message includes identifying an indicator that the message is a challenge message. The instructions also provide for parsing the message to locate the machine answerable question in the challenge message followed by analyzing the question to determine a valid response to the challenge message. A nontrivial amount of resources are required to determine the valid response. Finally, the instructions provide for sending the valid response via the network interface and communications network. The valid response includes the answer to the machine answerable question and receipt of the valid response results in the e7mail server being registered as a valid e-mail server. As a result, subsequent e-mail messages sent by the e-mail server will not require sending a valid response to a challenge message.

Another embodiment of the presently disclosed invention provides a method of registering an electronic mail (e-mail) sender for the purpose of sending e-mail messages to an. e-mail recipient. The e-mail sender receives a challenge message in response to an e-mail message previously sent by the e-mail sender, the challenge message including a machine answerable question. The challenge message is then processed to determine that the message is a challenge message sent for the purpose of authorizing delivery of e-mail messages. Processing the challenge message in this regard includes identifying an indicator that the message is a challenge message. The message is then parsed to locate the machine answerable question. in the challenge message. The question is then analyzed to determine a valid response to the challenge message. A nontrivial amount of resources are required to determine the valid response to the challenge message. A response to the challenge message is then sent to an auditor, which is a different entity than the e-mail recipient. The auditor sends a report concerning the response to the e-mail recipient that identifies that the response includes an answer to the Machine answerable question and that the e-mail sender should be registered as a valid e-mail sender. As a result of being registered, subsequent e-mail messages sent by the e-mail sender will not require sending a valid response to a challenge message to the auditor.

In yet another embodiment of the presently disclosed invention, a method of classifying electronic-mail (e-mail) messages from an e-mail sender to an e-mail recipient is disclosed. Through this particular method, a challenge message is generated. The challenge message includes a machine answerable question and for which a corresponding response may be generated by a machine associated with the e-mail sender. Generating the response to the message includes a nontrivial amount of resources with respect to processing the challenge message to determine that the message is a challenge message sent for the purpose of classifying e-mail messages including identification of an indicator that the message is a challenge message; parsing the message to locate the machine answerable question in the challenge message; and analyzing the question to determine a valid response to the challenge message. The challenge message is then sent to the e-mail sender. A determination is later made as to whether a valid response to the challenge message has been sent by the e-mail sender. A valid message 'results in. the sender being classified as a valid sender and excepted from future challenge messages.

Another embodiment of the present invention describes a computer-readable storage medium having embodied thereon a program. The program is executable by a computer processor to perform a method of classifying electronic-mail (e-mail) messages from an e-mail sender to an e-mail recipient.

In a still further embodiment of the present invention, an electronic-mail (e-mail) server configured to classify an e-mail message from an e-mail sender to an e-mail recipient is provided. The server includes memory configured to store computer-executable instructions for classifying an e-mail message and a processor configured to execute the instructions stored in memory. When executed, the instructions cause the generation of a challenge message including a machine answerable question and for which a corresponding response may be generated by a machine associated with the e-mail sender. Generating the response requires a nontrivial amount of resources with. respect to processing the challenge message to determine that the message is a challenge message sent for the purpose of classifying e-mail messages including identification of an indicator that the message is a challenge message; parsing the message to locate the machine answerable question in the challenge message; and analyzing the question to determine a valid response to the challenge message. The message is then sent via a network interface configured to send the challenge message over a communications network. A valid response to the challenge message includes the answer to the machine answerable question and. results in the e-mail sender being classified as a valid e-mail server and excepted from future challenge messages.

Another embodiment of the present invention includes a method of classifying an electronic-mail. (e-mail) message from a message sender to a message recipient. A challenge message including a machine answerable question is generated and for which a corresponding response may be generated by a machine associated with the e-mail sender. Generating the response requires a nontrivial amount of resources with respect to processing the challenge message to determine that the message is a challenge message sent for the purpose of classifying e-mail messages including identification of an indicator that the message is a challenge message; parsing the message to locate the machine answerable question in the challenge message; and analyzing the question to determine a valid response to the challenge message. The challenge message is sent to the e-mail sender and a response is received at an auditor, wherein, the auditor is a different entity than the message sender. The auditor is configured to send a report concerning the response to the message recipient that identifies that the response includes an answer to the machine answerable question and that the e-mail sender should be classified as a valid e-mail sender whereby subsequent e-mail messages sent by the e-mail sender will not require sending a valid response to a challenge message to the auditor.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved email registration system is disclosed. In this specification, email registration is used to refer to any process, task, or other requirement placed on a sender of an email (or the system that sent the email) to allow the email to be delivered. One type of registration is challenge/response, as described above. Once the challenge is sent and the response is correctly returned, the email is successfully registered so that it can be delivered. Other emails from the same sender or associated with the sender in some way may also be concurrently or subsequently delivered as a result of the registration.

Several improvements to existing human answerable challenge/response processes are disclosed. An auditor is included in the challenge/response architecture that simplifies the response procedure and optionally monitors and approves responses. A machine answerable challenge is used that is directed to a module on a mail sender that is configured to receive and answer the challenge. The challenge may require a small but nontrivial amount of processing by the mail sender so that an entity sending millions of mails to addresses for which it has not registered would be taxed by the process while a normal sender would be relatively unburdened answering only challenges to register with new recipients. The machine answerable challenge may also include a human answerable element. In some embodiments, registration is accomplished using a modified challenge wherein no response is required for registration.

As used herein, an email sender may refer to any individual, device, organization or other entity that is associated with the sending of an email. Such an entity may be identified in any manner that is appropriate for a given application. For example, the sender may be identified by an email address, a domain name, an IP address or other identifier that identifies a mail server or other source of the email. When a sender is registered, the registration may be only valid for the specific email that was challenged in some cases. More likely, the sender wilt be listed as a valid sender ("whitelisted"), or at least as a sender that can respond to challenges. Email from whitelisted senders may be delivered without further testing or challenges in some cases. The "sender" or entity that is whitelisted may include just the source email address or the all addresses in the domain of the source email address or any other relevant set of entities identified in any useful manner including by mail server or IP address. The registration of a sender may be sufficient of itself to authorize delivery of an email or group of emails, or the registration may be a factor considered in classifying the email along with other factors.

Figure 1:
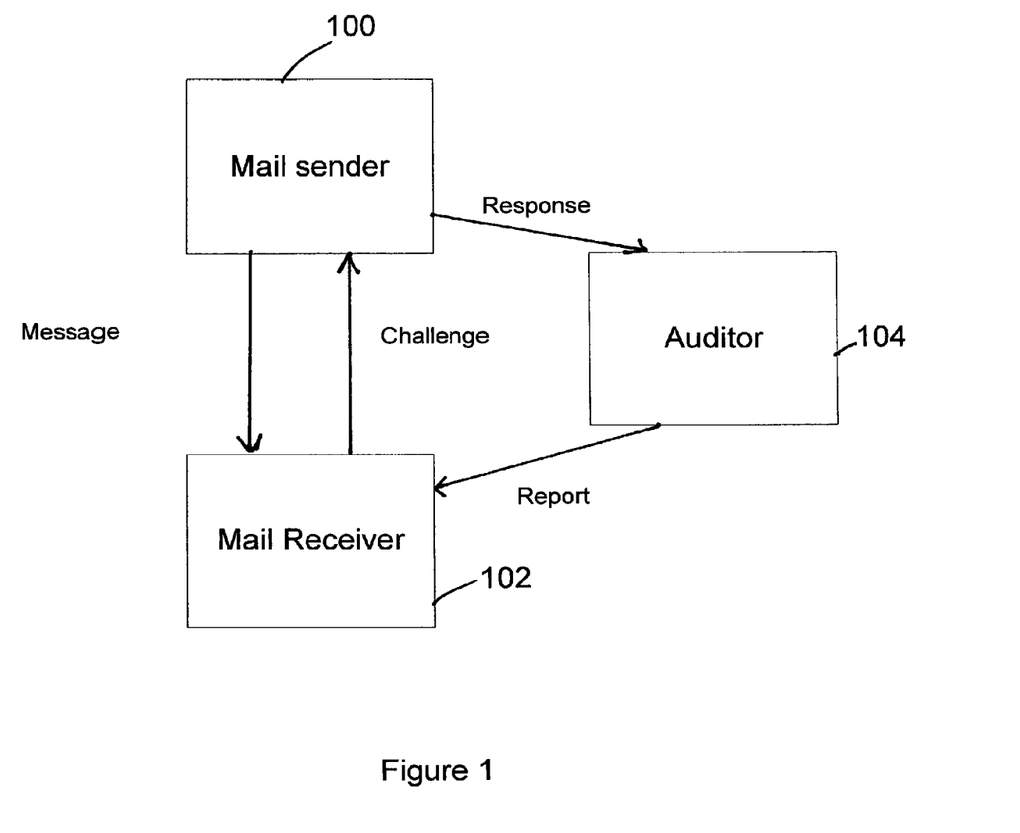
FIG. 1 is a block diagram illustrating a challenge/response system that includes a third party.

FIG. 1 is a block diagram illustrating a challenge/response system that includes a third party. Mail sender 100 and mail receiver 102 include software and/or hardware capable of sending and receiving messages. Mail sender 100 and mail receiver 102 may be either clients or servers, depending on how a given mail system is configured. They may be stand alone programs or systems, or plug ins that are parts of other programs or systems. A message is sent from mail sender 100 and is received by mail receiver 102 for an intended recipient. If mail receiver 102 determines that the message may possibly be spam, it generates a challenge and sends the challenge to mail sender 100.

In some embodiments, mail sender 100 automatically processes the challenge, generates a response, and sends the response to auditor 104. In some embodiments, mail sender 100 alternatively lets the user manually answer the challenge, then generates a reply based on the answer and sends the reply to auditor 104. The auditor is a third party server that independently verifies the reply and sends a report to mail receiver 102. In some embodiments, the auditor resides on the same device as mail receiver 102, and is able to communicate the verification results to mail receiver 102.

The auditor provides several improvements to the challenge/response process in various embodiments. First, the process of responding to a challenge is simplified in some embodiments by providing in the challenge one or more links to a web server maintained by the auditor. For example, multiple links may be provided, each corresponding to a possible answer. Thus, only one action, selection of the correct link, is required of the sender to manually respond to a challenge. In addition, the auditor, because it sees all challenge/responses, can detect patterns in responses such as many responses coming from the same domain and determine if a spammer is attempting to defeat the system. If such an event is detected, then the auditor can determine not to authorize delivery in its report to mail receiver 102 or send additional information along with its report to mail receiver 102 identifying the message as probably spam to facilitate mail receiver 102 further analyzing the message and making a correct classification decision. It should be noted that the report from the auditor can be used as a factor in the mail classification decision made by the mail receiver and that the auditor report does not necessarily solely determine the classification.

In some embodiments, the challenge includes a machine answerable question that is more easily answered by a machine than a human. For example, the challenge may include a problem that requires extensive computation or searching to solve. Mail sender 100 is capable of monitoring incoming challenges and automatically answering the machine answerable question. Thus, problems associated with having a person answer the challenge questions are overcome. However, if spammers could copy the portion of the mail client that answers challenges and then answer challenges in an automated fashion without incurring any penalty, they could possibly defeat the challenge/response system.

The machine answerable challenge is designed such that to process and answer the challenge, a nontrivial amount of resources is consumed. A nontrivial amount of resource is defined as an amount of resources that is small in a single instance, but when many instances (on the order of 1000) of such nontrivial amounts are added together, the collective amount of resource is large enough to incur significant costs. A nontrivial amount of system resource may have a small impact on the system in a single instance but may impact the system's operations significantly when many instances are added together. As computer systems increase in speed, the amount of processing that would be required to be nontrivial would increase as well.

The nontrivial amount of resources may be adjusted as desired in a specific system, but generally is greater than the minimum amount of resource necessary to generate a properly formatted reply message. The impact of consuming a nontrivial amount of resource for processing a challenge, or even several challenges, is relatively small and does not affect a regular user very much. However, for a spammer who sends out millions of spam messages, the number of challenges he receives would be on the order of thousands and therefore the collective resource consumed in handling the challenges would be significant. By associating a small cost with every response to a challenge, the improved challenge/response system makes it more difficult for the spammers to successfully deliver large amounts of email.

Many different types of resources are applicable. For example, the challenge question may be processing intensive, and the resource consumed is CPU cycles. In one embodiment, the challenge question asks how many prime factors are in a very large integer. The algorithm used to calculate the number of prime factor is computationally intensive, and takes between a fraction of a second to a few minutes to run. While the machine is answering a challenge and performing the computations, it may slow down a bit, but the overall performance of the system does not appear to change very much to the sender who's using the computer. On the other hand, if a spammer receives thousands of challenge messages back, the amount of CPU cycles needed to process the challenges would significantly slow down the spammer's computer system, thus hampering the spammer's operations. In different embodiments, the machine answerable question consumes various types of resource, such as memory and system resources.

One advantage of the number of prime Factors question is that it lends itself to a multiple choice answer. The correct answer may be, for example, three, and that may also be the answer to an alternative question that a user may answer relating to the number of objects in a graphic image. Other computationally intensive challenges are used, such as asking for two prime factors of a large number. The amount of resources may be adjusting the size of the number that must be factored.

In some embodiments, the resource is money. Small amounts of money (also referred to as micropayments) are required in the response process. In one embodiment, the sender's response to a challenge authorizes the auditor to collect a small micropayment that would be insignificant unless a very large number of responses are sent. The system may be structured so that the sender has some money deposited in an escrow account, and a small amount of money is deducted every time he answers a challenge. Alternatively, the response may authorize payment and the sender is billed if a significant payment accrues.

In some embodiments, the resource is some type of rights such as licensing rights. For example, a legal copy of the mail client may only be able to answer a limited number of challenges within a period of time. Since it is unlikely that spammers would actually acquire a large number of legal licenses for the mail client, they would not be able to legitimately send out large quantities of spam.

It should be noted that the various embodiments of nontrivial response costs may be used with the architecture shown in FIG. 1 or in an architecture that does not include the third party auditor. For example, if factoring a large number is used, the mail receiver may multiply two primes, store the factors along with an identifier for the email, and wait to determine whether the proper response is received from the mail sender.

Figure 2:
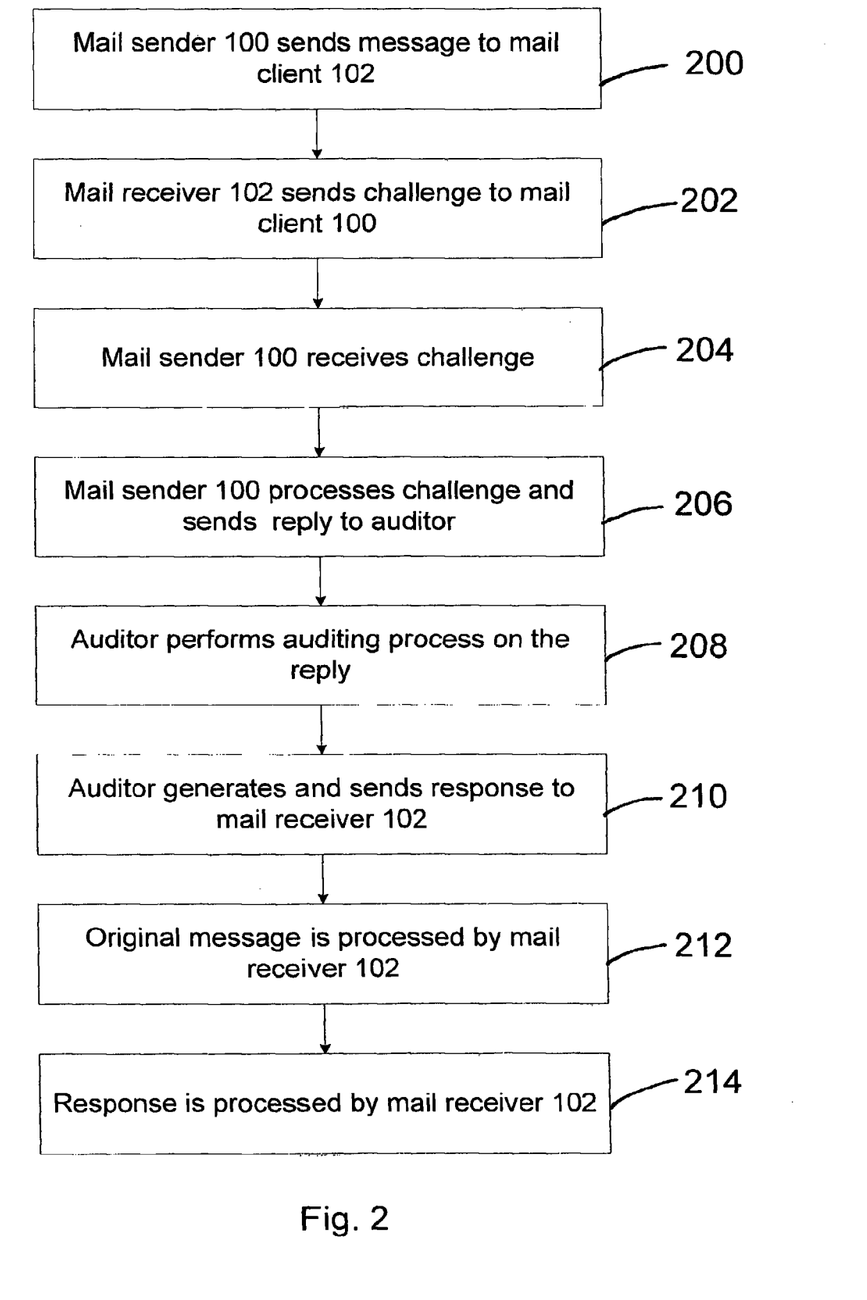
FIG. 2 is a flowchart illustrating an exemplary challenge/response process. The process begins when mail sender 100 sends a message to mail receiver 102 (200).

FIG. 2 is a flowchart illustrating an exemplary challenge/response process. The process begins when mail sender 100 sends a message to mail receiver 102 (200). Upon receiving the message, mail receiver 102 sends a challenge to mail sender 100 (202). The challenge includes the question or problem, as well as a mail identifier so that if a response is received, it can be matched with the correct mail message and the corresponding challenge. Meanwhile, the message is kept in a temporary location, such as a temporary folder.

Mail sender 100 includes special software or hardware that enables it to answer the challenge question automatically. Mail sender 100 receives the challenge (204), processes the challenge to determine the correct response, and sends a reply that includes the response and the mail message identifier to the auditor (206). In different embodiments, the auditor may either be on a separate device or on the same device as mail receiver 102. In the embodiment shown, the auditor is third party software that resides on a server separate from mail receiver 102.

The auditor receives the reply from mail sender 100 and performs an auditing process on the reply (208). The auditing processing of the mail client by the auditor varies for different embodiments and is described in detail later. The auditor generates a report based on the processing results and sends the report to mail receiver 102 (210). In some embodiments, the report is an email message. The report may also be an http request or may be sent using any appropriate communication link between the auditor process, and the email delivery process. The report may include the status of the sender's address and/or information regarding whether the answer to the challenge question is correct. In some embodiments, the auditor leaves the answer verification up to mail receiver 102 and includes the answer received from mail sender 100 in its report to mail receiver 102. Alternatively, the auditor may evaluate the response from the mail sender and send either an authorization for the mail message or a confirmation that the mail message is spam.

Based on the report from the auditor, mail receiver 102 processes the original message (212). In some embodiments, the processing includes verification of the reply received from mail sender 100. In some embodiments, the processing also includes classifying the message. For example, if the message is not from a known spammer and the answer to the challenge is correct, the original message is moved from the temporary location that stores the message to the recipient's inbox; otherwise, the message is considered spam and is deleted. Mail receiver 102 then further processes the report from the auditor, if necessary, and deletes the report (214).

Figure 3:
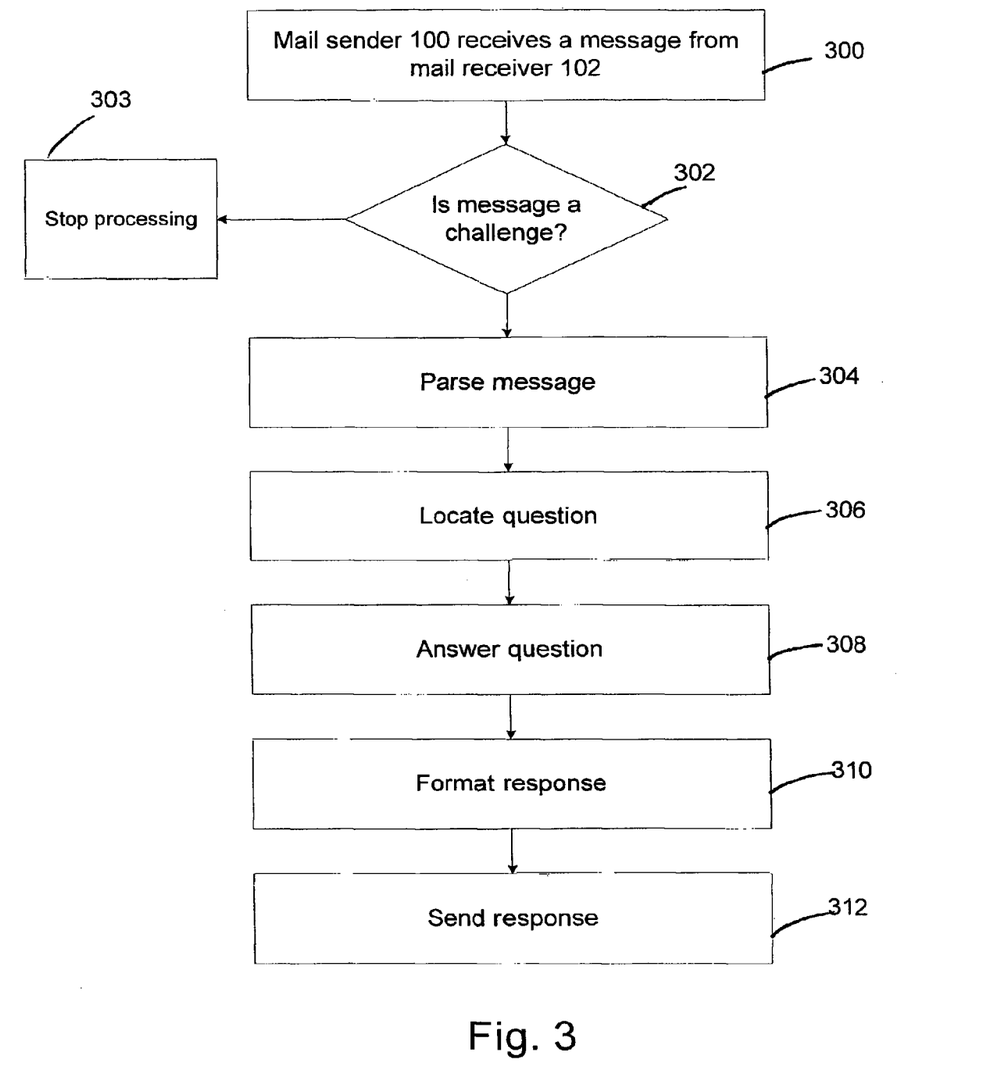
FIG. 3 is a flowchart illustrating how mail sender 100 handles a challenge, according to one embodiment of the present invention.

FIG. 3 is a flowchart illustrating how mail sender 100 handles a challenge, according to one embodiment of the present invention. The process begins when mail sender 100 receives a message from mail receiver 102 (300). It is then determined whether the message is a challenge (302), using techniques such as analyzing the header and/or the body of the message.

If the message is determined not to be a challenge, the processing stops (303); otherwise, the message is further processed. The message is parsed (304), and then analyzed to locate the question (306). In one embodiment, the challenge is formatted as a Hypertext Markup Language (HTML) document, and an attribute marked with an HTML tag <alt> is used to store the question. The text following the <alt> tag is a large integer, and the question is to determine the number of prime factors in this large integer. The mail client then proceeds to answer the question (308). For questions such as the prime factor question, the mail client uses built in functions to automatically perform such computation.

Since computing the prime factors of a sufficiently large number is a computationally intensive process, it takes the mail client a nontrivial amount of time to arrive at the correct answer. A reply that includes the answer is then formatted (310) and sent to the auditor (312). In this embodiment, to format the reply, a universal resource locator (URL) of the auditor is found in the challenge. An HTTP request that includes the auditor URL, the message identifier of the challenge, the answer and the address of the original sender is formatted and sent to the auditor. In other embodiments, other appropriate protocols are used to format the response.

Figure 4:
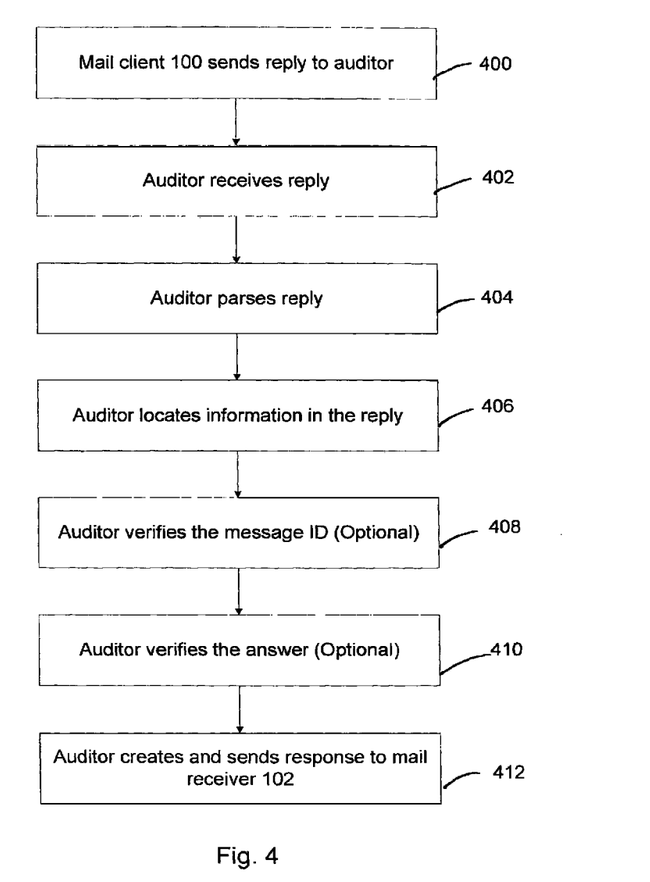
FIG. 4 is a flowchart illustrating the audit process according to one embodiment of the present invention.

FIG. 4 is a flowchart illustrating the audit process according to one embodiment of the present invention. In this embodiment, the auditor is a third party that resides on a server separate from the mail clients. The process begins when mail sender 100 sends its reply to the auditor (400). The auditor receives the reply (402), and performs processing including parsing the reply (404) and locating information within the reply (406).

In some embodiments, the auditor uses the information to perform optional verification steps (408 and 410). The message identifier (ID) of the original message is checked by the auditor to verify that the reply is not fake (408). The auditor verifies the answer to the question and determines whether the answer is correct (410).

Based on the processed results, the auditor creates a report and sends the report to mail receiver 102. In one embodiment, the report is an HTTP request that includes the message identifier, the original sender, and the answer to the challenge. In other embodiments, the report gives an instruction to classify the message or a probability that the message should be classified in a certain way. The report may also provide further information about the message and the results of the challenge/response process.

Specialized software code or a hardware component is used by mail sender 100 to automatically answer the challenge question. However, a given message sender may not have a mail client capable of automatically answering the challenge question. To make the challenge answerable even when the mail client does not have the answering feature, in some embodiments, a human answerable question, such as previously mentioned question concerning the number of objects in a picture, is also included in the challenge. As noted above, the correct answer to the human answerable question may match the correct answer to the machine answerable question.

A sender's reply is generated based on the answer selected by the sender. The reply may be sent to the mail receiver directly, or sent to a third party auditor that verifies the reply and generates a report to the mail sender to aid in classifying the message. In one embodiment, the challenge is formatted as an HTML document, with answers embedded as URL links. Selecting the correct answer causes an HTTP request to be sent, where the HTTP request may include information about the answer, the message identifier of the original message, information about the original sender, or combinations thereof. Embedding the answers as links to a web server maintained by the auditor simplifies the response process for the mail senders and allows the response to be generated by a single "click" or selection.

Many spammers send so many messages that it is not practical for them to receive responses at all of the email addresses that they have generated. If an email challenge is sent to in response to such a spam message, that challenge will often bounce. This fact is the basis of a null challenge used in one embodiment. The null challenge simply sends a reply to the mail sender's email acknowledging receipt of the email or including some other message, but without inviting a response. If the reply from the mail receiver is delivered successfully and no error message is received within a certain period of time, then the mail receiver considers the challenge to have been successful. Thus, the null challenge simply pings the mail sender to make sure the from address in the message is a valid address where mail may be sent. The null challenge does not provide the same level of security as a challenge that requires computational resources to generate a response or a challenge that requires a human response, but since many spammers do not provide resources to accept reply messages at all of the addresses they use, the null challenge helps to classify many messages.

Other variations of the architecture and processes described are used in other embodiments. For example, it may not be desirable to send a challenge directly from the mail receiver to the mail sender, since that would confirm receipt by the sender. Instead, the challenge may be sent from the auditor to the sender on behalf of the receiver. The auditor monitors the response and sends the report including results or instructions to the mail receiver.

Improved registration of a sender of electronic messages has been described. The improved registration system enables mail senders to respond to challenges efficiently while deterring spammers. Registration may be accomplished by various techniques, including challenge and response. In some embodiments, the challenge includes a machine answerable question that requires a nontrivial amount of resource to answer The need for a human response in all cases is eliminated, while still making it impractical for a spammer to respond to a large number of challenges. The difficulty of the challenge may be adjusted to an appropriate level to deter spammers but not require too many resources from a legitimate sender. The challenge may alternatively include a human answerable question. An auditor is integrated into the challenge/response system that simplifies the response process. The auditor may also provide additional analysis and reporting to the mail receiver, and may help avoid having the mail receiver interact directly with the mail sender. In some embodiments, the challenge requires only that it be accepted by the mail sender and that an error message not be generated in response to the challenge.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of registering an electronic-mail (e-mail) sender for the purpose of sending e-mail messages to an e-mail recipient, the method comprising:
   receiving a challenge answer sent from the e-mail sender to an independent third-party auditor, the challenge answer in response to a challenge message sent by the e-mail recipient;
   executing instructions stored in memory, wherein execution of the instructions by a processor of the independent third-party auditor:
   evaluates validity of the response, and
   determines whether there is a pattern in challenge answers related to the e-mail sender that is indicative of spam; and
   sending a report from the independent third-party auditor to the e-mail recipient regarding the validity of the response and whether there is a pattern in challenge answers related to the e-mail sender that is indicative of spam, wherein the e-mail recipient processes e-mail messages from the e-mail sender based on the report.

2. The method of claim 1, wherein the independent third-party auditor receives a plurality of challenge answers from a plurality of sources.

3. The method of claim 1, wherein the pattern is a common domain across the plurality of challenge answers.

4. The method of claim 3, wherein the report from the independent third-party auditor indicates that the e-mail sender is a spammer.

5. The method of claim 1, wherein the independent third-party auditor maintains a web server associated with the challenge and wherein the challenge comprises one or more links.

6. The method of claim 1, wherein the report from the independent third-party auditor indicates that e-mails from the e-mail sender is not authorized for delivery.

7. The method of claim 1, wherein evaluation of the response by the independent third-party auditor evaluates the response includes checking a message ID associated with the challenge answer.

8. A system of registering an electronic-mail (e-mail) sender for the purpose of sending e-mail messages to an e-mail recipient, the system comprising:
   an independent third-party auditor server for:
      receiving a challenge answer sent from the e-mail sender in response to a challenge message,
      executing instructions stored in memory, wherein execution of the instructions by a processor of the independent third-party auditor:
      evaluates validity of the response, and
      determines whether there is a pattern in challenge answers related to the e-mail sender that is indicative of spam; and
      sending a report to the e-mail recipient regarding the validity of the response and whether there is a pattern in challenge answers related to the e-mail sender that is indicative of spam, wherein the e-mail recipient processes e-mail messages from the e-mail sender based on the report.

9. The system of claim 8, further comprising a mail receiver server for sending the challenge message to the e-mail sender, wherein the challenge answer is sent by the e-mail sender in response to the challenge message.

10. The system of claim 8, wherein the independent third-party auditor receives a plurality of challenge answers from a plurality of sources.

11. The system of claim 8, wherein the pattern is a common domain across the plurality of challenge answers.

12. The system of claim 8, wherein the report from the independent third-party auditor indicates that the e-mail sender is a spammer.

13. The system of claim 8, wherein the independent third-party auditor maintains a web server associated with the challenge and wherein the challenge comprises one or more links.

14. The system of claim 8, wherein the report from the independent third-party auditor indicates that e-mails from the e-mail sender is not authorized for delivery.

15. The system of claim 8, wherein evaluation of the response by the independent third-party auditor evaluates the response includes checking a message ID associated with the challenge answer.

16. A non-transitory computer-readable storage medium, having embodied thereon a program executable by a processor to perform a method of registering an electronic-mail (e-mail) sender for the purpose of sending e-mail messages to an e-mail recipient, the method comprising:
   receiving a challenge answer sent from the e-mail sender to an independent third-party auditor, the challenge answer in response to a challenge message sent by the e-mail recipient;
   evaluating validity of the response;
   determining whether there is a pattern in challenge answers related to the e-mail sender that is indicative of spam; and
   sending a report from the independent third-party auditor to the e-mail recipient regarding the validity of the response and whether there is a pattern in challenge answers related to the e-mail sender that is indicative of spam, wherein the e-mail recipient processes e-mail messages from the e-mail sender based on the report.

* * * * *